Aug. 20, 1968 W. B. ELAM ET AL 3,398,037
CONTAINER MANUFACTURING MACHINE
Filed Dec. 10, 1963 3 Sheets-Sheet 3

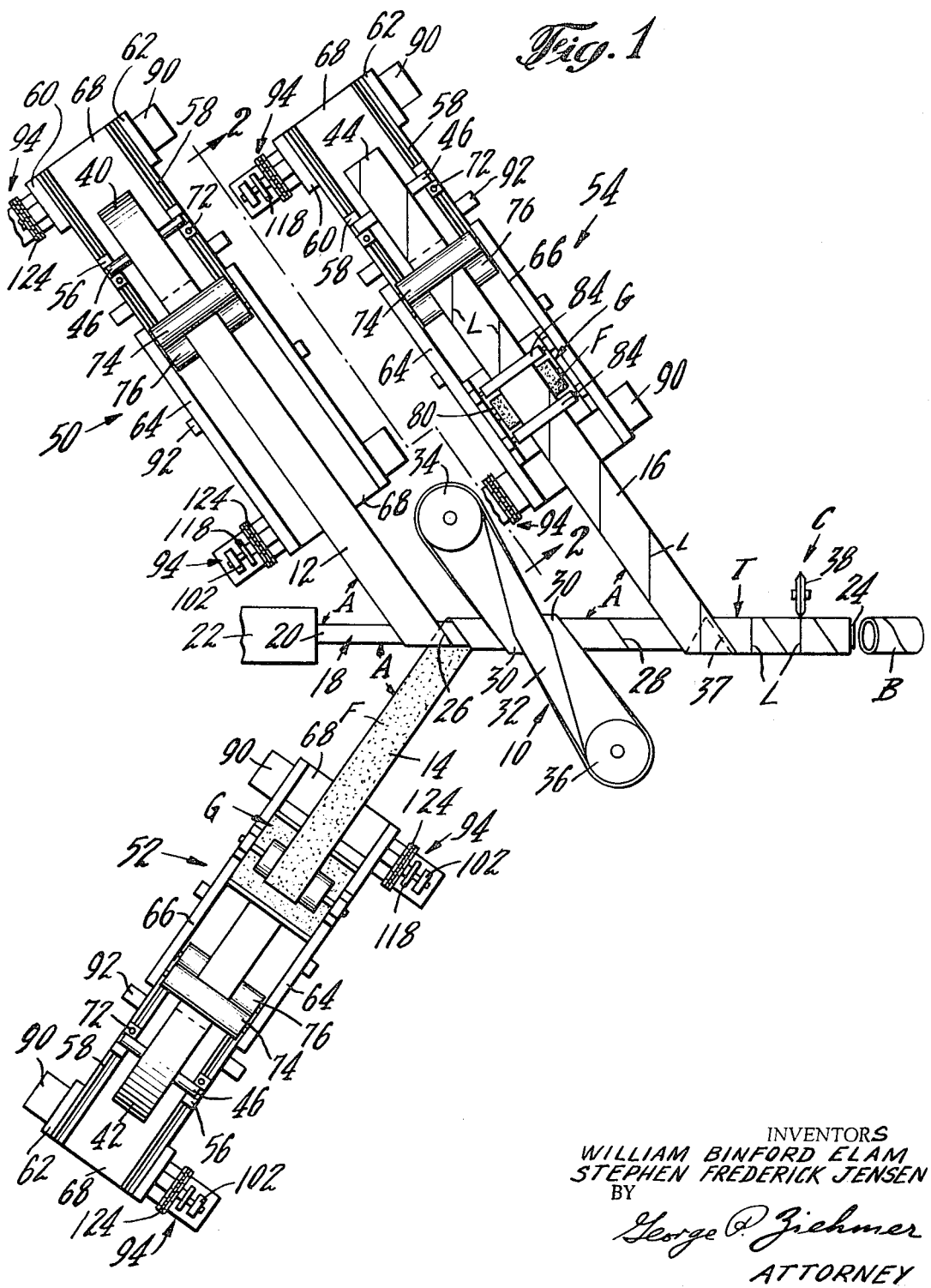

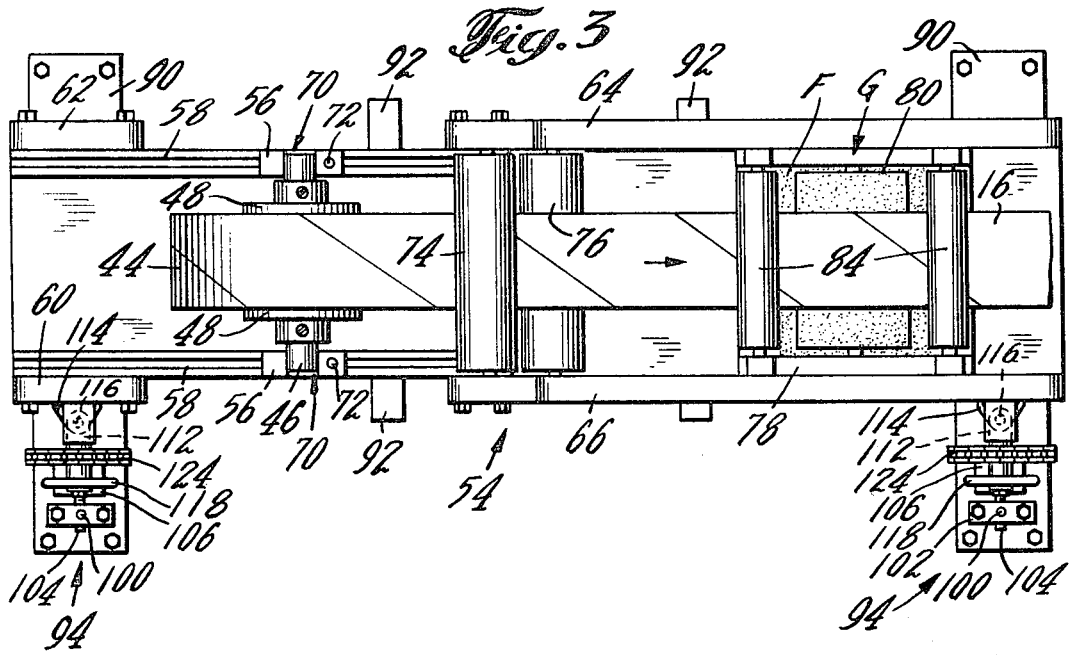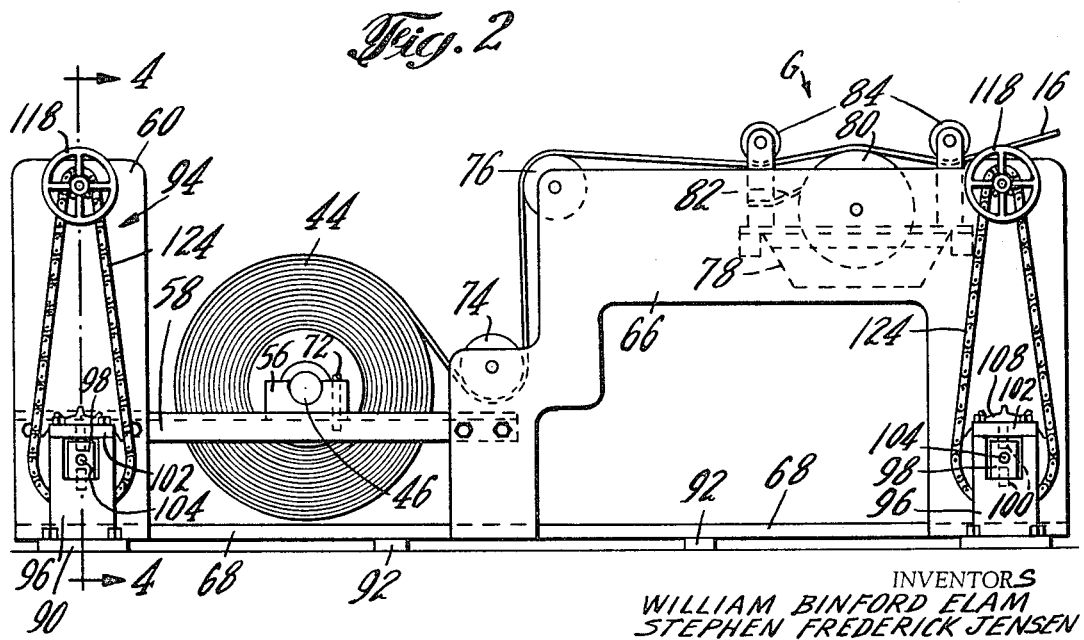

INVENTORS
WILLIAM BINFORD ELAM
STEPHEN FREDERICK JENSEN
BY
George P. Ziehmer
ATTORNEY

United States Patent Office 3,398,037
Patented Aug. 20, 1968

3,398,037
CONTAINER MANUFACTURING MACHINE
William Binford Elam, Oakland, N.J., and Stephen Frederick Jensen, New York, N.Y., assignors to American Can Company, New York, N.Y., a corporation of New Jersey
Filed Dec. 10, 1963, Ser. No. 329,446
4 Claims. (Cl. 156—428)

The present invention relates to container manufacturing machines, and has particular reference to unwind stands designed to improve the accuracy and performance of spiral winding machines.

One type of container which at the present time is enjoying increasing popularity is the composite container having metal ends and a fibrous body which is formed on a machine widely referred to as a spiral winding machine, or, alternatively, a spiral winder.

In such a machine, the materials of which the bodies are formed are fed in web form from a plurality of supply rolls and are directed at a winding mandrel at a predetermined "winding angle" which is determined by the width of the webs which comprise the main body plies and by the diameter of the mandrel, and are wound, one upon the other, in helical form around the mandrel.

Such bodies frequently comprise at least two main body ply webs which are wound so that the edges of each web are disposed in self-abutting relationship to form a helical butt joint, the helical butt joint of one web being substantially offset relative to that of the other web in order to produce a strong, self-supporting, continuously formed tube which subsequently is divided into individual can bodies. In many instances, a liner ply web is spirally wound onto the mandrel beneath the main body ply webs, and frequently a preprinted label ply web is spirally wound onto the outside of the outer main body ply web to complete the body structure. Usually, the edges of the liner and label ply webs are overlapped or sealed together in some manner to inhibit penetration of liquid and/or moisture into the main body plies.

The operation of such a spiral winder is usually a very difficult procedure, primarily because of the fact that all of the various webs must be fed onto the mandrel at a very precise angle lest gaps be produced between their abutting helical edges. Since this angle is determined for the most part by the width of the main body ply webs and by the diameter of the mandrel, and since the width of these webs frequently varies according to atmospheric conditions which affect the moisture content of the web stock, it is sometimes necessary to make minor but precise adjustments of the angle at which the various webs are fed onto the mandrel. In addition, it is frequently necessary to bodily shift the position of one or more of the webs longitudinally along the mandrel in order to control either the relative positions of the butt joints of the main body ply webs, or to control the width of the overlap of the liner and/or label ply webs.

Heretofore these adjustments have been made in a comparatively crude manner, in many instances by forcing the unwind stands on which the various web supply rolls are mounted into their new positions by hitting their bases with a sledge hammer. In addition, since in many instances other mechanisms, such as festoons, glue pots etc., which are mounted on separate bases are used in conjunction with these unwind stands, these mechanisms must also be moved whenever the unwind stands are moved in order to keep them in alignment therewith. These multiple adjusting operations are difficult and onerous to the machine operator and are thus delayed by many operators as long as possible, thus frequently resulting in sub-par production.

The present invention provides an improved web feeding mechanism which makes these necessary adjustments a relatively easy task, and thus encourages the operators to make running adjustments to the machine as soon as the need for them is clearly indicated. As a result, greater accuracy of winding is obtained, and the overall quality of the container bodies produced by the spiral winder is substantially improved.

These improved results are obtained by the provision of a web feeding mechanism wherein each supply roll unwind stand, together with the other mechanisms associated therewith, are mounted on a common base which is provided at both ends with easily adjustable means for moving the base relative to a fixed support. Thus, the angle at which the web is fed is fed to the mandrel, as well as the longitudinal relationship between the web and the mandrel, can be readily varied by moving either end of the base, or by moving both ends of the base, as necessary.

Since the mechanism associated with the unwind stands are also mounted on the adjustable base, they move with and are automatically adjusted to the new position of the unwind stand. As a result, the newly desired positions of the web can be readily and easily obtained, with no great effort on the part of the machine operator.

An object of the present invention, therefore, is the provision of an easily adjustable supply roll unwind stand.

Another object is the provision of a mechanism whereby all of the mechanisms associated with the unwind stand are automatically adjusted at the same time as an adjustment is made to the position of the unwind stand.

Yet another object is the provision of such a mechanism whereby a running adjustment of the position of the web relative to the mandrel can be made without the necessity for stopping the spiral winder.

Numerous other objects and advantages of the invention will be apparent as it is better understood from the following description, which, taken in connection with the accompanying drawings, discloses a preferred embodiment thereof.

Referring to the drawings:

FIGURE 1 is a plan view of a spiral winder embodying the instant invention.

FIG. 2 is a side elevation on an enlarged scale taken substantially along the line 2—2 in FIG. 1;

FIG. 3 is a plan view of the mechanism of FIG. 2;

Figure 4:
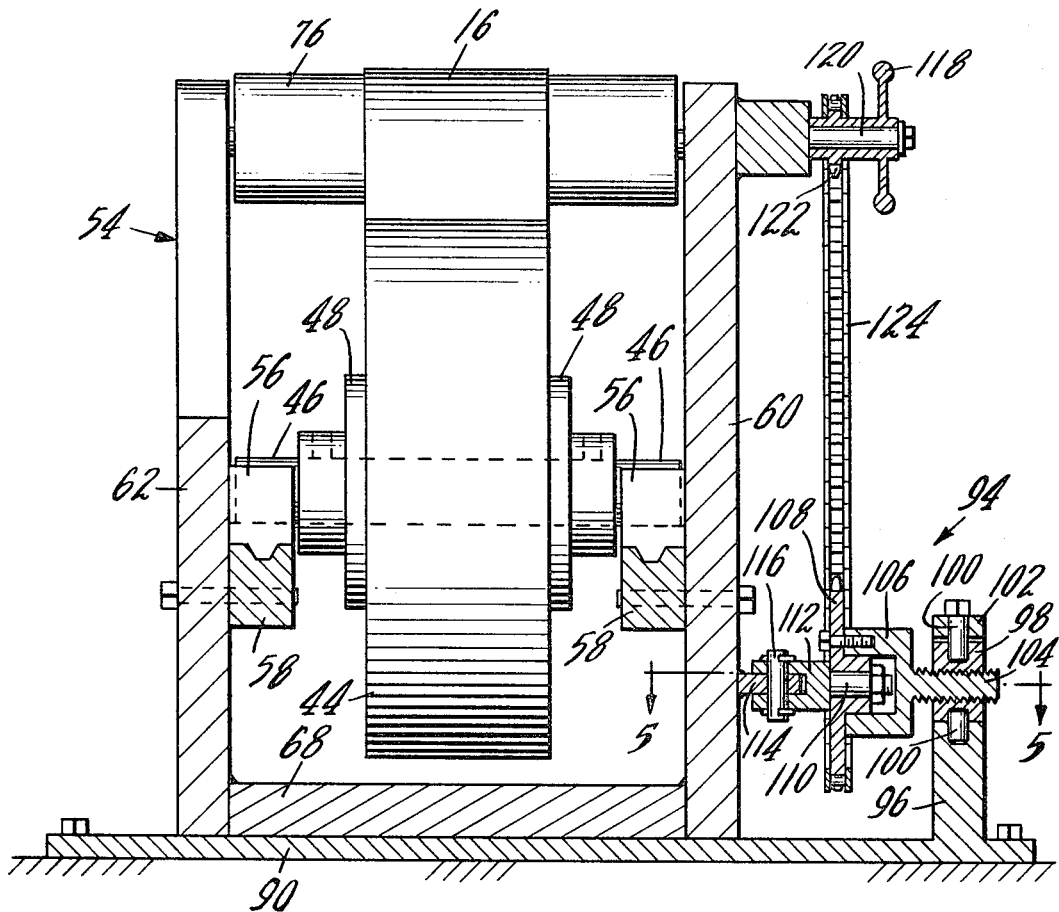
FIG. 4 is a vertical section on an enlarged scale taken substantially along the line 4—4 in FIG. 2.

As a preferred and exemplary embodiment of the invention, FIG. 1 illustrates the principal parts of a spiral winding machine 10 wherein three webs 12, 14, 16 are helically wound in superposed relationship around a stationary winding mandrel 18 to form a continuously formed tube T which is subsequently cut into segments by a cutting device C along the lines L to form individual can bodies B. One end 20 of the mandrel 18 is mounted in a fixed mounting block 22, the other end 24 of the mandrel being free to permit the bodies to be discharged from the machine to any suitable place of deposit.

The webs 12, 14 preferably are formed of comparatively heavy paper stock, such as kraft or chipboard, and comprise the main body layers or plies of the tube T. The web 12, which comprises the first or inner body ply, is the first web fed onto the mandrel 18, and is directed thereto at an angle, indicated by the letter A, which is known as the winding angle, and wrapped around the mandrel 18 in such manner that the lateral, helically disposed edges of successive turns of the web 12 are butted against one another to form a butt joint 26. The winding angle A is, generally speaking, determined by the width of the web 12 and the diameter of the winding mandrel 18.

The web 14 comprises the second or outer main body ply and is of the same width as the ply 12 and is fed towards the mandrel 18 at the winding angle A so that its helically wound edges also are disposed in abutting relationship to form a butt joint 28 which is, however, out of registry with the butt joint 26. It will be noted that although the webs 12, 14 are fed to the mandrel at the same angle, they are fed from opposite sides of the mandrel. To permit this, the web 12 is fed over the top of the mandrel 18 while the web 14, passes beneath and then upwardly around the mandrel. The web 14 is so fed that the butt joints 26, 28 are offset a distance equal to about half the width of the ply 12.

After the webs 12, 14 have thus been wound around the mandrel 18, the partially completed tube passes through several turns 30 of an endless winding belt 32 which is wrapped around the mandrel 18. The belt 32 is mounted on a pair of rotatable drums 34, 36 which are driven in any suitable manner from the main drive (not shown) of the machine 10. The belt and its driving mechanism are conventional in spiral winders.

The belt 32 serves to move the tube T longitudinally along the mandrel 18, and to rotate it to give it a helical motion.

The web 16 preferably comprises a label ply which may be preprinted with an endless succession of printed unitary label patterns (not shown) which are printed at an angle to the edges of the web. Each of the label patterns preferably includes one of the printed lines L which is angularly disposed on the web 16 and marks the line of separation between the individual label patterns. The web 16 is also fed toward the mandrel 18 at the winding angle A. It is preferably somewhat wider than the webs 12, 14, however, so that instead of butting, its edge portions overlap in the finished tube to produce a helical lap joint 37. It will be noted that after the label web is wound onto the tube, the lines L are disposed at right angles to the mandrel 18 and form complete circles around the tube.

The cutter device C, which includes a circular knife 38, is provided to sever the tube T along the lines L to form it into individual can bodies B. This device C, and the means used to index it to the lines L are disclosed in United States Patents Re. 23,899 and 2,737,091. After the bodies B have been thus severed, they are discharged from the mandrel 18 to any suitable place of deposit (see FIG. 1).

As seen in FIG. 1, the webs 12, 14, 16 are fed towards the mandrel 18 from supply rolls 40, 42, 44, respectively, which are mounted on shafts 46 in such manner that they are freely rotatable. The supply rolls 40, 42, 44 are held against transverse movement on the shafts 46 by collars 48 which are secured to the shafts 46 on both sides of the rolls. The power necessary to pull the webs 12, 14, 16 from their supply rolls 40, 42, 44 is provided by the winding belt 32.

The supply rolls 40, 42, 44 are respectively supported on unwind stands, generally designated as 50, 52, 54, which are generally similar to each other. Each unwind stand includes a pair of slides 56 which are slideably mounted in a pair of tracks 58 which are bolted at one end to a pair of vertical standards 60, 62 and at the other to a pair of side plates 64, 66. The standards and side plates in turn are secured to a common base member or plate 68.

The ends of each of the shafts 46 are supported in notches 70 which are formed in the top portion of each of the slides 56, the slides 56 being readily movable in the tracks 58 to facilitate the positioning of the supply rolls therein, but being capable of being fixedly locked in place on the tracks 58 by locking pins 72 during operation of the spiral winder.

In order to guide the webs 12, 14, 16 towards the mandrel 18, each of the unwind stands is provided with a pair of idly rotatable guide rolls 74, 76 which are mounted in the side plates 64, 66.

The unwind stands 52, 54 are also provided with mechanisms G for applying a film of adhesive F to the webs 14, 16 in order to bond the three plies of the tube T together to form them into a solid structure.

It will be understood that the unwind stands 50, 52, 54 are generally similar in construction, and therefore only the unwind stand 54 is illustrated in detail, in FIGS. 2 through 5. It will also be understood that the various mechanisms carried by the unwind stands 50, 52, 54 and which operate in some manner on the webs 12, 14, 16, may differ somewhat in details and operation because of the fact that each of these webs must be treated in a different manner.

Thus, since it is not necessary to apply adhesive to the inner body ply web 12, the unwind stand 50 need not be provided with an adhesive applying mechanism G, or if it is so provided, such mechanism will be rendered inoperative.

Since it is necessary to apply the adhesive F to the upper surface of the web 14, the adhesive applying mechanism G carried by the unwind stand 52 will be of a type capable of effecting such an adhesive coating operation. Such a mechanism is conventional and it has not been deemed necessary to illustrate it in detail.

The adhesive applying mechanism G which is associated with the unwind stand 52 is of the type which is capable of applying a film of adhesive F to the undersurface of the label ply web 16. Such a mechanism is also conventional. As seen in FIGS. 2 and 3, it comprises an adhesive reservoir 78, an applying roll 80, a doctor blade 82, and a pair of hold-down rolls 84, all of these parts being suitably mounted on and movable with the side plates 64, 66.

It will also be understood that, if desired, other mechanisms, such as web festooning rolls which permit the supply rolls to be changed without stopping the spiral winder, etc. may be mounted on the unwind stands in such manner that they are movable with it in the same manner as is the adhesive applying mechanism, so that when the unwind stand is moved to adjust or correct the angle or position of feeding of its web relative to the winding mandrel 18, as will now be described, these mechanisms will simultaneously be moved so that they will remain in correct alignment with the supply roll in the unwind stand.

In order to permit such an adjustment, the ends of the unwind stand are slideably mounted on a pair of fixed supports flat plates or tracks 90 which are bolted to the floor of the room in which the spiral winder is located. In order to more evenly distribute the load, several smaller tracks 92 may be provided between the tracks 90. The tracks 92 need not be secured to the floor.

To effect relttive movement between the unwind stand 52 and the tracks 90, 92, an adjusting mechanism, generally designated as 94, is provided at each end of the unwind stand. This mechanism 94 comprises an upright standard 96 which is formed at one end of each of the tracks 90, the upper end of each standard 96 being cut away to accommodate a heavy, internally threaded nut 98 which is mounted for pivotal movement on a pair of pivot pins 100, one which is mounted in the standard 96 and the other of which is mounted in a cap plate 102 which is bolted to the upper end of the standard 96.

A thread bolt 104 engages within the nut 98, the bolt 104 being formed with an enlarged head 106 which is secured to a large spur gear 108 which is journalled for rotation on a small shaft 110 which is formed at the end of a split yoke 112 which is pivotally mounted on a flat horizontal lug 114 which is secured to the adjacent standard 60 of the unwind stand. The yoke 112 and lug 114 are connected by a pivot pin 116.

The spur gear 108, which is held against endwise movement on the shaft 110 by a nut 117 which is threaded onto the end of the shaft 110, is rotated on the shaft 110 by rotation of a hand wheel 118 which is carried on a shaft 120 which is secured to the upper end of the standard 60, the rotation of the hand wheel 118 being transmitted to the spur gear 108 through a small spur gear 122 and an endless chain 124.

Figure 5:
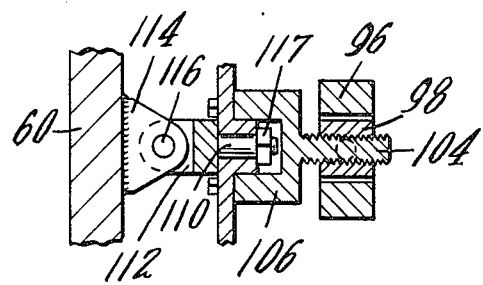
FIG. 5 is a fragmentary horizontal section taken substantially along the line 5—5 in FIG. 4, parts being broken away.

Thus, when the hand wheel 118 is rotated, the rotation of the bolt 104 in the nut 98 causes it to move either to the left or to the right, as seen in FIGS. 4 and 5, and this movement is transmitted to the standard 60 and thus to the unwind stand 54, thereby causing it to slide across the tracks 90, 92 in the direction necessary to effect the desired adjustment of the web relative to the mandrel 18.

If only one of the hand wheels 118 is rotated, the unwind stnad will be given a pivotal adjustment, since its opposite end will not be moved, and thus the winding angle of the web will be affected. The pivotal movement of the unwind stand will not cause binding of either of the adjusting mechanisms 94, because of the pivotal connections provided by the pivot pins 100 and 116.

It will be obvious that because of the fact that two adjusting mechanisms 94 are provided for each unwind stand, a wide flexibility of adjustment is provided. Thus, by rotating one hand wheel 118 or the other, or by rotating one a greater number of turns than the other, accurate adjustment of the winding angle can be obtained. In similar manner, by rotating both hand wheels 118 the same number of turns, the unwind stand, together with the associated mechtnisms mounted thereon, can be slid bodily across the rails 90, 92 to a new position in parallelism to its original position, thereby maintaining the winding angle but changing the position of the web relative to the other webs in the tube.

While in the accompanying drawings, the tube T is shown as formed from three webs of stock, it should be understood that fewer or more webs may be employed. It may, for example, be desirable to utilize a liner web which would be wound beneath the inner main body web 12. In such event, an adjustable unwind stand similar in construction to the stands 50, 52, 54 may be provided to hold the supply roll of the liner web.

It is though that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

We claim:

1. A supply roll unwind stand for supplying web stock being fed onto a mandrel to form a spirally wound tube, said unwind stand comprising a pair of spaced fixed supports, a moveable base perpendicular to and mounted on said fixed supports, a web treating mechanism mounted on said base, a supply roll rotatably mounted on said base for feeding web stock through said web treating mechanism and onto said mandrel, a pair of threaded bolts each connected at one end with said moveable base for pivotal movement with respect thereto in a horizontal plane and at the other end connected with said standard for pivotal movement with respect thereto in a horizontal plane, each of said bolts being threadedly connected at one of said ends so that when both of said bolts are rotated an equal number of turns in the same direction said moveable base is moved laterally and over said fixed supports to change the position on said mandrel at which said web stock is wound thereon and when said bolts are rotated in a different direction or an unequal number of turns in the same direction said moveable base is pivoted about a vertical axis to change the angle at which said web stock is fed onto said mandrel.

2. The supply roll unwind stand defined in claim 1 wherein said mechanism for treating said web is an adhesive applying mechanism.

3. The supply roll unwind stand defined in claim 1 wherein each of said bolts is rigidly connected with an axially aligned wheel so that said wheel may be rotated to rotate said bolt.

4. The supply roll unwind stand defined in claim 3 wherein each of said wheels is a spur gear which is engaged by another spur gear, further comprising two hand wheels each of which is mounted on the same shaft with one of said other spur gears so that when one of said hand wheels is rotated, it will impart rotation to one of said bolts.

References Cited

UNITED STATES PATENTS

| | | | |
|---|---|---|---|
| 741,117 | 10/1903 | Demory | 74—499 |
| 1,423,817 | 7/1922 | Pitz | 74—89.15 |
| 1,939,581 | 12/1933 | Tesmer | 156—428 X |
| 2,377,608 | 6/1945 | Bronson | 156—432 X |
| 2,748,830 | 6/1956 | Nash et al. | 156—432 X |
| 2,978,373 | 4/1961 | Mauck et al. | 156—432 X |
| 526,066 | 9/1894 | Wood | 248—23 |
| 1,935,877 | 11/1933 | Hamerstadt | 248—23 |

EARL M. BERGERT, *Primary Examiner.*

D. J. FRITSCH, *Assistant Examiner.*